United States Patent
Nishimura

(10) Patent No.: US 10,486,692 B2
(45) Date of Patent: Nov. 26, 2019

(54) VEHICLE COLLISION AVOIDANCE ASSIST SYSTEM

(71) Applicant: TOYOTA JIDOSHA KABUSHIKI KAISHA, Toyota-shi (JP)

(72) Inventor: Motoki Nishimura, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 178 days.

(21) Appl. No.: 15/362,178

(22) Filed: Nov. 28, 2016

(65) Prior Publication Data

US 2017/0210383 A1    Jul. 27, 2017

(30) Foreign Application Priority Data

Jan. 26, 2016 (JP) .................. 2016-012571

(51) Int. Cl.
*G06F 19/00* (2018.01)
*B60W 30/09* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC .. B60W 10/18; B60W 10/20; B60W 30/0953; B60W 30/0956; B60W 50/14;
(Continued)

(56) References Cited

U.S. PATENT DOCUMENTS 4,659,089 A * 4/1987 Rosa .................... F41J 2/02
250/495.1
5,332,057 A  7/1994 Butsuen et al.
(Continued)

FOREIGN PATENT DOCUMENTS

CN  102452396 A  5/2012
CN  103072575 A  5/2013
(Continued)

*Primary Examiner* — Ronnie M Mancho
(74) *Attorney, Agent, or Firm* — Oblon, McClelland, Maier & Neustadt, L.L.P.

(57) ABSTRACT

A vehicle collision avoidance assist system, including: a forward obstacle detecting device; a lateral object detecting device; and a controller including an automatic braking control executing portion to execute an automatic braking control for permitting a brake apparatus to automatically operate, an avoidance control executing portion to execute, in addition to the automatic braking control, an avoidance control for permitting a steering apparatus to automatically operate, and an avoidance control prohibiting portion to prohibit execution of the avoidance control, wherein the avoidance control prohibiting portion prohibits execution of the avoidance control when the lateral object detecting device detects a lateral moving object that is moving on a lateral side of an own vehicle in the same direction as the own vehicle is travelling and there is a risk that the own vehicle and the lateral moving object will collide with each other if the avoidance control is executed.

5 Claims, 6 Drawing Sheets

(51) Int. Cl.
*B60W 50/14* (2012.01)
*G06K 9/00* (2006.01)
*B60W 10/18* (2012.01)
*B60W 10/20* (2006.01)
*B60W 30/095* (2012.01)

(52) U.S. Cl.
CPC .... *B60W 30/0953* (2013.01); *B60W 30/0956* (2013.01); *B60W 50/14* (2013.01); *G06K 9/00798* (2013.01); *B60W 2050/143* (2013.01); *B60W 2420/42* (2013.01); *B60W 2420/52* (2013.01); *G06K 9/00805* (2013.01)

(58) Field of Classification Search
CPC ....... B60W 2050/143; B60W 2420/42; B60W 2420/52; B60W 30/09; G06K 9/00798; G06K 9/00805
USPC .......................................................... 701/23
See application file for complete search history.

(56) References Cited

U.S. PATENT DOCUMENTS

| | | | |
|---|---|---|---|
| 5,485,892 A | 1/1996 | Fujita | |
| 7,495,600 B2* | 2/2009 | Rees | G01S 13/723 342/29 |
| 7,613,568 B2* | 11/2009 | Kawasaki | B60R 21/013 340/435 |
| 7,996,133 B2* | 8/2011 | Wang | B60R 21/0134 701/45 |
| 8,224,564 B2* | 7/2012 | Ogasawara | G08G 1/165 701/301 |
| 8,248,295 B2* | 8/2012 | Tsunekawa | B60R 21/0134 342/70 |
| 8,965,677 B2* | 2/2015 | Breed | B60W 30/04 701/301 |
| 9,505,411 B2* | 11/2016 | Kobana | B60W 50/12 |
| 9,711,050 B2* | 7/2017 | Ansari | G08G 1/167 |
| 9,981,658 B2* | 5/2018 | Ichikawa | B60W 30/09 |
| 2004/0090117 A1 | 5/2004 | Dudeck et al. | |
| 2004/0193351 A1 | 9/2004 | Takahashi et al. | |
| 2004/0193374 A1 | 9/2004 | Hac et al. | |
| 2007/0112516 A1 | 5/2007 | Taniguchi | |
| 2015/0153735 A1* | 6/2015 | Clarke | B60W 30/00 701/301 |
| 2015/0166062 A1* | 6/2015 | Johnson | B60W 30/12 701/41 |
| 2015/0210274 A1 | 7/2015 | Clarke et al. | |
| 2016/0101779 A1* | 4/2016 | Katoh | G06T 7/20 340/435 |
| 2016/0144896 A1* | 5/2016 | Takahashi | B60K 28/14 701/41 |
| 2016/0280266 A1 | 9/2016 | Kawamata | |
| 2016/0349364 A1 | 12/2016 | Hara | |
| 2016/0375901 A1* | 12/2016 | Di Cairano | B60W 30/09 701/26 |
| 2017/0137023 A1* | 5/2017 | Anderson | B60G 17/0195 |

FOREIGN PATENT DOCUMENTS

| | | |
|---|---|---|
| CN | 103171554 A | 6/2013 |
| DE | 100 36 276 A1 | 2/2002 |
| DE | 10 2009 020 649 A1 | 11/2010 |
| JP | 5-58319 A | 3/1993 |
| JP | 5-113822 A | 5/1993 |
| JP | 2000-159077 A | 6/2000 |
| JP | 2004-299455 A | 10/2004 |
| JP | 2005-257923 A | 9/2005 |
| JP | 2006-168629 | 6/2006 |
| JP | 2007-137116 | 6/2007 |
| JP | 2008-179251 | 8/2008 |
| JP | 2010-260473 A | 11/2010 |
| JP | 2011-186878 A | 9/2011 |
| JP | 2011-195083 A | 10/2011 |
| JP | 2015-057688 A | 3/2015 |
| JP | 2015-98233 A | 5/2015 |
| JP | 2015-151040 A | 8/2015 |

\* cited by examiner

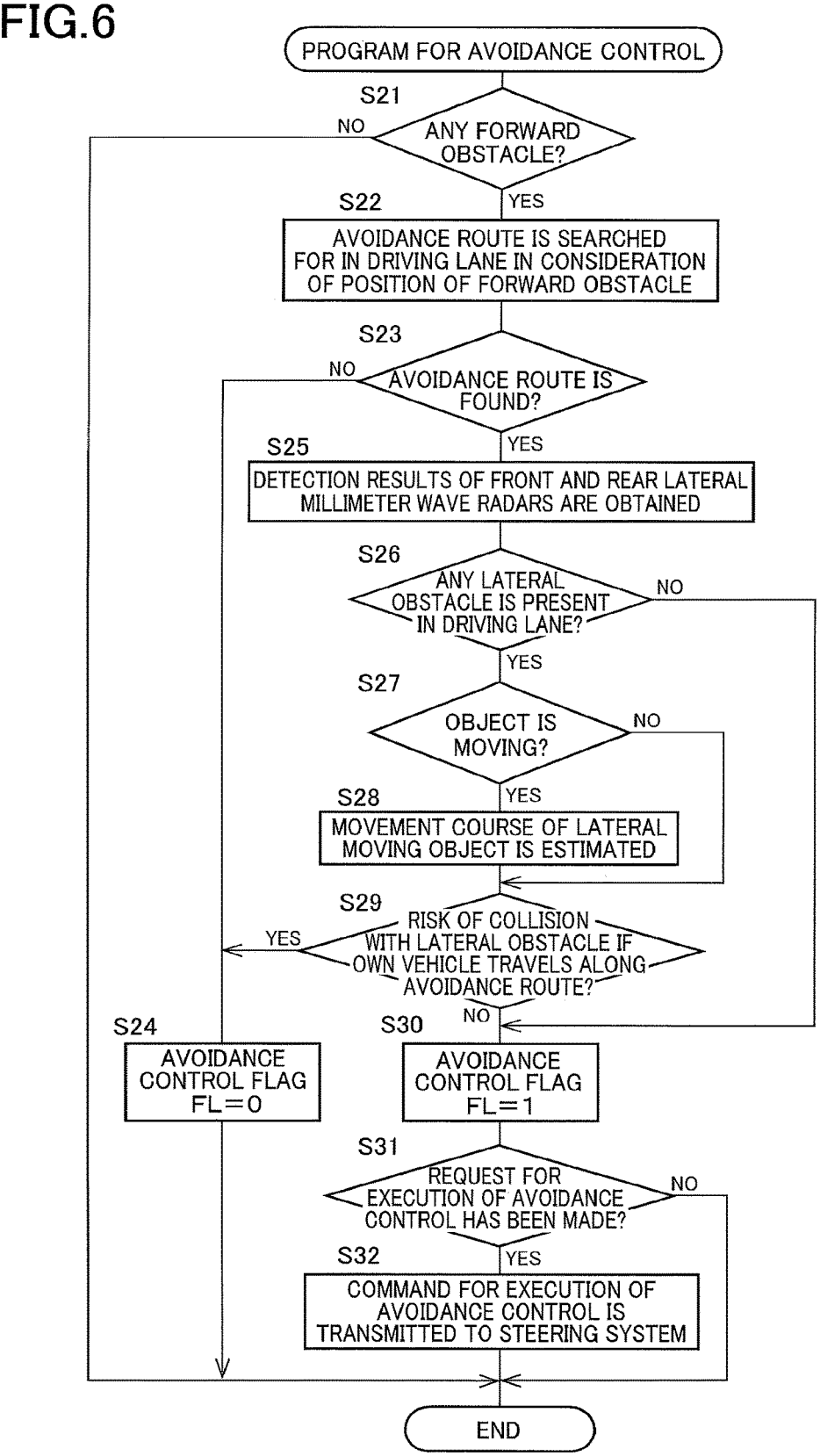

VEHICLE COLLISION AVOIDANCE ASSIST SYSTEM

CROSS REFERENCE TO RELATED APPLICATION

The present application claims priority from Japanese Patent Application No. 2016-012571, which was filed on Jan. 16, 2016, the disclosure of which is herein incorporated by reference in its entirety.

BACKGROUND

Technical Field

The following disclosure relates to a vehicle collision avoidance assist system for assisting avoidance of a collision of one's own vehicle with an obstacle.

Description of Related Art

A vehicle collision avoidance assist system is for avoiding a collision between: a vehicle on which the system is installed; and an obstacle or for reducing damage at the time of the collision. When a risk or possibility that a vehicle will collide with a forward obstacle present ahead of the vehicle is high, a vehicle collision avoidance assist system disclosed in JP-A-2007-137116 executes an automatic braking control in which a brake apparatus installed on the vehicle automatically operates to brake the vehicle and an avoidance control in which a steering apparatus installed on the vehicle automatically operates to enable the vehicle to avoid the forward obstacle.

SUMMARY

The vehicle collision avoidance assist system in which the avoidance control is executable is still under development and has much room for improvement. Thus, the utility of the system can be enhanced by various modifications. An aspect of the disclosure provides a vehicle collision avoidance assist system having high practical utility.

A vehicle collision avoidance assist system according to one aspect of the disclosure is based on a system configured such that, when a risk of collision of an own vehicle with a forward obstacle is high even after an automatic braking control has been executed, the system executes an avoidance control, in addition to the automatic braking control. Further, when a lateral object detecting device detects a lateral moving object that is moving on a lateral side of the own vehicle in the same direction as the own vehicle is travelling and there is a risk that the own vehicle and the lateral moving object will collide with each other if the avoidance control is executed, the system prohibits execution of the avoidance control.

According to the vehicle collision avoidance assist system constructed as described above, when the lateral moving object such as a motorcycle or a bicycle is running on the lateral side of the own vehicle and there is a risk that the own vehicle will collide with the lateral moving object, the avoidance control is not executed. Thus, the vehicle collision avoidance assist system prevents an occurrence of a secondary accident in which the lateral moving object gets involved, as a result of execution of the avoidance control.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention.

The following form (1) is a base of the claimable invention. A combination of the form (1) and technical features described in any of forms (2)-(6) corresponds to the claimable invention. Specifically, a combination of the form (1) and the form (5) corresponds to a first embodiment. A form in which the technical features of the form (6) are added to the first embodiment corresponds to a second embodiment. A form in which the technical features of the form (2) are added to the first or second embodiment corresponds to a third embodiment. A form in which the technical features of the form (3) are added to the third embodiment corresponds to fourth embodiment. A form in which the technical features of the form (4) are added to any one of the first through fourth embodiments corresponds to a fifth embodiment.

(1) A vehicle collision avoidance assist system for assisting avoidance of a collision: between an own vehicle on which the system is installed; and an obstacle, the system comprising:

a forward obstacle detecting device configured to detect, as a forward obstacle, one of objects present ahead of the own vehicle that will hinder the own vehicle from travelling forward; and a controller including (a) an automatic braking control executing portion configured such that, when a risk of collision of the own vehicle with the forward obstacle detected by the forward obstacle detecting device is high, the automatic braking control executing portion executes an automatic braking control in which a brake apparatus installed on the own vehicle automatically operates to brake the own vehicle and (b) an avoidance control executing portion configured such that, when the risk of collision of the own vehicle with the forward obstacle is still high even after the automatic braking control has been executed, the avoidance control executing portion executes, in addition to the automatic braking control, an avoidance control in which a steering apparatus installed on the own vehicle automatically operates to enable the own vehicle to avoid the forward obstacle.

As mentioned above, this form is a base of the claimable invention. This forms lists basic constituent elements of the vehicle collision avoidance assist system of the claimable invention. The vehicle collision avoidance assist system of this form aims at avoiding the collision of the own vehicle with the forward obstacle mainly by automatically braking the vehicle when the risk of collision of the own vehicle with the forward obstacle is high and further by executing automatic steering in addition to automatic braking when the collision with the forward obstacle is unavoidable only by braking.

Whether or not "the risk of collision of the own vehicle with the forward obstacle is high" may be determined by various techniques based on a relative distance, a relative speed, and a relative acceleration, of the own vehicle and the forward obstacle, a time to collision with the forward obstacle, etc. Whether or not "the risk of collision of the own vehicle with the forward obstacle is still high even after the automatic braking control has been executed" may be determined with consideration given to deceleration of the own vehicle or the like, in addition to the relative distance, the relative speed, and the relative acceleration, of the own vehicle and the forward obstacle.

As the "forward obstacle detecting device", there may be employed at least one of a radar-type device to detect the obstacle by reflection of a radio wave, a laser-type device to detect the obstacle by reflection of a laser beam, and a camera device to detect the obstacle by processing taken images. As the "brake apparatus", there may be employed a brake apparatus of the so-called brake-by-wire configured to generate a braking force depending on a force generated by an actuator without depending on an operation force applied to a brake operation member. As long as the "steering apparatus" is capable of steering wheels depending on a force generated by an actuator, the "steering apparatus" may be a steering apparatus of steer-by-wire or a power steering device equipped with an assisting mechanism for assisting steering of the wheels by the actuator.

(2) The vehicle collision avoidance assist system according to the form (1), wherein the avoidance control executing portion executes the avoidance control when the forward obstacle detecting device detects the forward obstacle within a driving lane that is a driving range in which the own vehicle is to travel, so as to enable the own vehicle to avoid the forward obstacle within the driving lane.

This form is configured to enable the own vehicle to avoid, within the driving lane, the forward obstacle that is present in the driving lane. For instance, this form enables the own vehicle to avoid the forward obstacle preset in the driving lane without going out beyond the driving lane. In other words, this form is configured not to execute the avoidance control when it is impossible for the own vehicle to avoid the forward obstacle within the driving lane. That is, this form prevents the own vehicle from coming into contact with other vehicles running outside the driving lane and persons present outside the driving lane, so as to prevent any possible secondary accident that would be otherwise caused by execution of the avoidance control. In this form, it is only required to determine, in the avoidance control, an avoidance route for the own vehicle within a limited range, making it possible to reduce a processing load in calculation for determination of the avoidance route, for instance.

(3) The vehicle collision avoidance assist system according to the form (2), further comprising a driving lane identifying device configured to identify the driving lane by recognizing a right boundary and a left boundary of the driving lane,
  wherein the avoidance control executing portion is configured such that, when the forward obstacle detecting device detects the forward obstacle in the driving lane, the avoidance control executing portion executes the avoidance control to enable the own vehicle to avoid the forward obstacle such that the own vehicle travels toward one of opposite sides of the forward obstacle on which a distance between the forward obstacle and a corresponding one of the right boundary and the left boundary of the driving lane is larger than the other of the opposite sides.

It is desirable that a direction in which the own vehicle is to be steered in the avoidance control coincide with a direction in which the driver is supposed to operate. In this form, the direction in which the own vehicle is to be steered in the avoidance control is determined based on situations around the own vehicle. In this form, the direction in which the own vehicle is to be steered is limited to either the right side or the left side of the forward obstacle. Thus, the avoidance route is determined within a further limited range of the driving lane, making it possible to further reduce a processing load in determination of the avoidance route. The boundaries may include lane lines, guardrails, curbs, gutters, pavement edges. The "driving lane identifying device" may be a device configured to process taken images and to recognize the boundaries, namely, may be a device constituted mainly by a camera. In an instance where a camera device is employed as the forward obstacle detecting device, the camera device may function also as the "driving lane identifying device".

(4) The vehicle collision avoidance assist system according to any one of the forms (1)-(3), further comprising an alert device configured to issue an alert to a driver of the own vehicle when there is a risk of collision of the own vehicle with the forward obstacle,
  wherein the automatic braking control executing portion is configured such that, when the driver performs no operation after the issuance of the alert and the risk of collision of the own vehicle with the forward obstacle accordingly becomes high, the automatic braking control executing portion executes the automatic braking control.

This form is configured to call a driver's attention before execution of the automatic braking control. It is desirable not to automatically brake the vehicle wherever possible. Thus, this form may be configured to await a driver's operation until a certain time before the own vehicle collides with the forward obstacle, for prioritizing the driver's operation. According to this form, it is possible to execute the automatic braking control and the avoidance control only just before the own vehicle collides with the forward obstacle.

(5) The vehicle collision avoidance assist system according to any one of the forms (1)-(4), further comprising a lateral object detecting device configured to detect an object present on a lateral side of the own vehicle;
  wherein the controller includes an avoidance control prohibiting portion configured to prohibit execution of the avoidance control, and
  wherein the avoidance control prohibiting portion prohibits execution of the avoidance control when the lateral object detecting device detects a lateral moving object that is moving on a lateral side of the own vehicle in the same direction as the own vehicle is travelling and there is a risk that the own vehicle and the lateral moving object will collide with each other if the avoidance control is executed.

According to the vehicle collision avoidance assist system of this form, when the lateral moving object, such as a motorcycle or a bicycle, is running on a lateral side of the own vehicle, whether or not to execute the avoidance control is determined with consideration given also to the lateral moving object. The avoidance control is not executed when there is a risk that the own vehicle will collide with the lateral moving object. Consequently, this form prevents an occurrence of a secondary accident in which the lateral moving object gets involved, as a result of execution of the avoidance control. The "lateral object detecting device" is desirably configured to monitor an area ranging from a diagonally front side to a diagonally rear side of the vehicle on each of right and left sides of the vehicle. As the lateral object detecting device, there may be employable one having a construction similar to the forward obstacle detecting device described above.

(6) The vehicle collision avoidance assist system according to the form (5), wherein the avoidance control executing portion includes an avoidance route determining portion configured to determine an avoidance route for the own vehicle to avoid the forward obstacle, and wherein the avoidance control prohibiting portion prohibits execution of the avoidance control when there is a risk that the own vehicle and the lateral moving object will collide with each other if the own vehicle travels along the determined avoidance route.

In this form, the avoidance route is determined only for the purpose of avoiding the forward obstacle, and the avoidance control is not executed when there is a risk that the own vehicle will collide with the lateral moving object if the own vehicle travels along the determined avoidance route. This form enables quick determination as to whether or not the avoidance control is to be executed, as compared with an arrangement which makes a search for an avoidance route that enables the vehicle to avoid both of the forward obstacle and the lateral moving object. For instance, it is possible to obviate a decrease in a damage reduction effect attained by the automatic braking control at the time of collision of the own vehicle with the forward obstacle.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 6 is a flow chart showing a program for an avoidance control executed by the controller of the collision avoidance assist system of FIG. 1.

DETAILED DESCRIPTION OF THE EMBODIMENT

Figure 1:
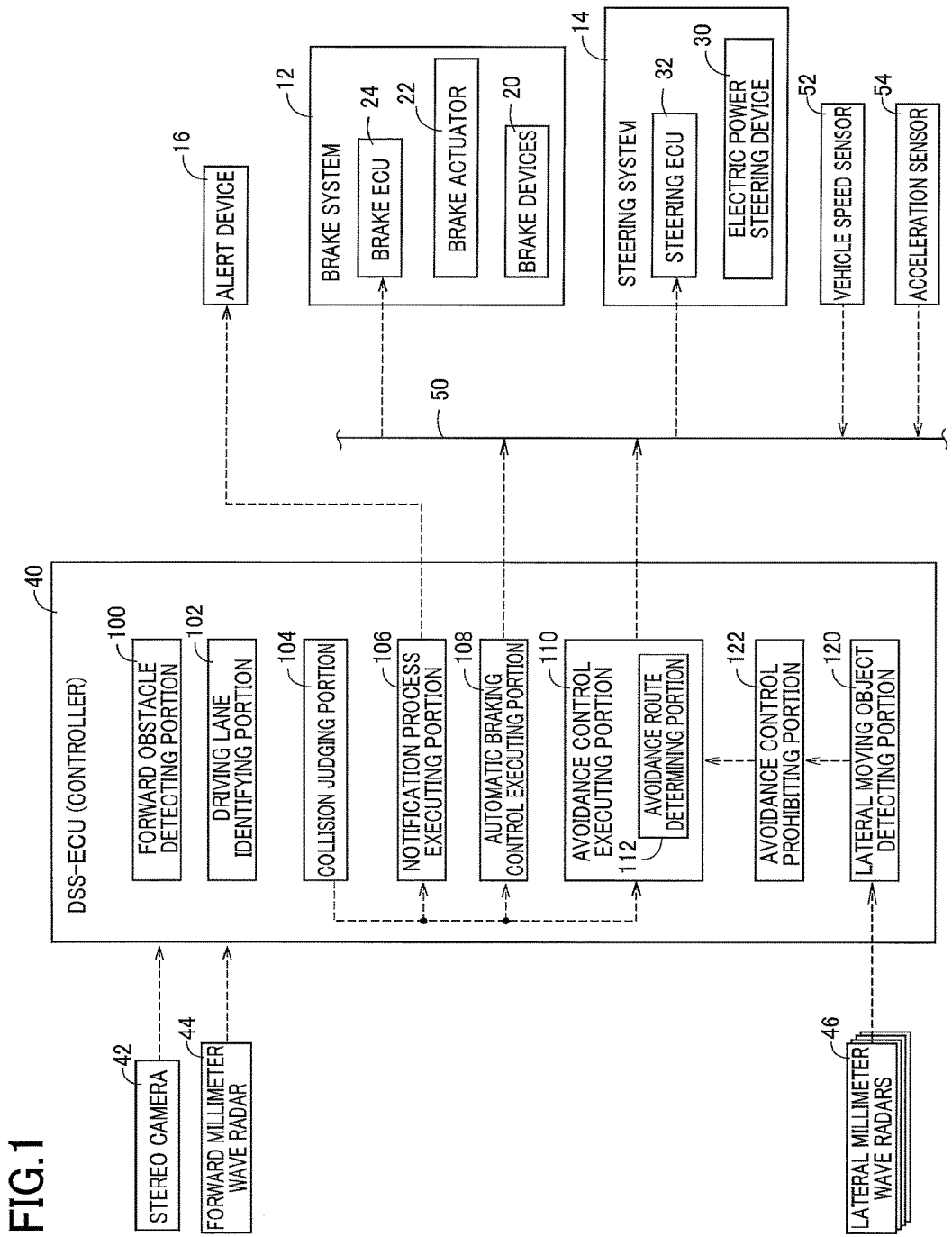
FIG. 1 is a block diagram showing a configuration of a vehicle on which a collision avoidance assist system according to one embodiment of the claimable invention is installed and a functional configuration of the system.

Referring to the drawings, there will be explained below in detail one embodiment of the claimable invention. It is to be understood that the claimable invention is not limited to the details of the following embodiment and the forms described in Forms of the Invention, but may be changed and modified based on the knowledge of those skilled in the art. It is further to be understood that modifications of the following embodiment can be provided utilizing technical features described in the Forms of the Invention.

Embodiment

Configuration of Vehicle

FIG. 1 is a block diagram schematically showing a configuration of a vehicle 10 on which a collision avoidance assist system (hereinafter simply referred to as "assist system" where appropriate) according to one embodiment of the claimable invention is installed and a functional configuration of the assist system. The vehicle 10 on which the assist system is installed will be hereinafter referred to as "own vehicle 10" where appropriate. As shown in FIG. 1, there are installed, on the vehicle 10, a brake system 12, a steering system 14, and an alert device 16, in addition to the assist system.

The brake system 12 (as one example of a brake apparatus) is an electronically controlled hydraulic brake system, namely, a brake system of the so-called brake-by-wire. The brake system 12 is configured such that, in normal running of the vehicle 10, a hydraulic pressure to be supplied to brake devices 20 provided for respective wheels of the vehicle 10 is generated by a brake actuator 22 without depending on an operation force applied to a brake operation member. The brake system 12 includes a brake ECU 24, and the brake actuator 22 is controlled by the brake ECU 24.

The steering system 14 (as one example of a steering apparatus) includes: an electric power steering device 30 for assisting a driver's steering operation by a force generated by an electric motor; and a steering ECU 32 for controlling the electric motor. The electric power steering device 30 is configured to steer the wheels by both of an operation force applied to a steering operation member and an assist torque that depends on the force generated by the electric motor. The steering system 14 is capable of steering the wheels only by the force generated by the electric motor.

Figure 2:
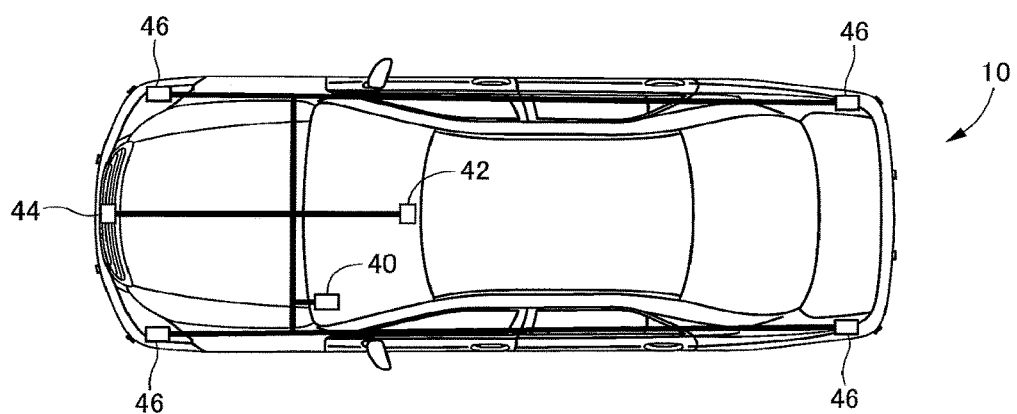
FIG. 2 is a schematic plan view of the collision avoidance assist system of the embodiment.

As also shown in FIG. 2, the assist system includes a DSS-ECU 40 for controlling the system, a stereo camera 42 and a forward millimeter wave radar 44 for detecting an object present ahead of the vehicle, and four lateral millimeter wave radars 46 for detecting an object present on each of a right side and a left side of the vehicle.

The stereo camera 42 is disposed at a front middle of the vehicle body and includes a pair of cameras arranged in a right-left direction of the vehicle for taking an image of the front side of the vehicle. The stereo camera 42 detects objects such as other vehicles, pedestrians, and structures, based on a parallax of an image of each camera (parallax image). It is possible to obtain a distance to each object based on the detection results. The forward millimeter wave radar 44 is disposed at the front middle of the vehicle body. The forward millimeter wave radar 44 is configured to emit a millimeter radio wave forward and to measure a radio wave reflected by and returned from the object present ahead of the vehicle, so as to detect the object present ahead of the vehicle. It is possible to obtain a distance to the object and a relative speed of the own vehicle and the object based on the detection results. The four lateral millimeter wave radars 46 are similar in structure to the forward millimeter wave radar 44 and are respectively disposed at a front right portion, a rear right portion, a front left portion, and a rear left portion, of the vehicle body, so as to respectively detect objects present on a front right side, a rear right side, a front left side, and a rear left side, of the vehicle.

As explained later in detail, the DSS-ECU 40 constantly monitors around the own vehicle 10 based on the detection results of the stereo camera 42, the forward millimeter wave radar 44, and the four lateral millimeter wave radars 46. When there is a risk of collision of the own vehicle 10 with the obstacle, the DSS-ECU 40 activates the alert device 16 and issues a command to the brake system 12 and the steering system 14, so as to avoid the collision with the obstacle. In this respect, the DSS-ECU 40 is connected to the brake ECU 24 and the steering ECU 32 via a car area network (CAN) 50 and is communicable with one another.

The vehicle 10 is further equipped with a vehicle speed sensor 52 for detecting a running speed of the own vehicle and an acceleration sensor 54 for detecting acceleration in the longitudinal direction of the own vehicle. The ECUs are configured to receive detection results of the vehicle speed sensor 52 and the acceleration sensor 54 via the CAN 50.

Operation of Collision Avoidance Assist System (a) Monitoring Front Side of Vehicle and Automatic Braking Control While the own vehicle 10 is running, the DSS-ECU 40 constantly obtains the detection results of the stereo camera 42 and monitors whether any forward obstacle is present or not. The DSS-ECU 40 processes images of the pair of cameras obtained from the stereo camera 42 and obtains parallax images thereof. Based on the parallax images, the DSS-ECU 40 detects objects, such as other vehicles, pedestrians, and structures, and obtains a distance to each object. The DSS-ECU 40 determines whether there exists, among the objects present ahead of the own vehicle detected by the stereo camera 42, an object that will hinder the own vehicle 10 from travelling forward. When there is such an object, the DSS-ECU 40 determines the object as a forward obstacle $A_F$ (e.g., a pedestrian in FIG. 3). Based on the parallax images, the DSS-ECU 40 recognizes lines, namely, a right line $L_R$ and a left line $L_L$, respectively extending on the right side and the left side of the own vehicle 10 in the longitudinal direction, as a right boundary and a left boundary of a driving lane that is a driving range in which the own vehicle 10 is to travel, so as to identify the driving lane.

When the forward obstacle $A_F$ is detected by the stereo camera 42, the DSS-ECU 40 obtains, from the detection results of the stereo camera 42, a relative distance $D_A$ of the own vehicle 10 and the forward obstacle $A_F$. The DSS-ECU 40 obtains the detection results of the forward millimeter wave radar 44 and corrects the relative distance $D_A$ based on the detection results. The DSS-ECU 40 also obtains, from the detection results of the forward millimeter wave radar 44, a relative speed $V_A$ and relative acceleration $a_A$, of the own vehicle 10 and the forward obstacle $A_F$. Subsequently, the DSS-ECU 40 calculates a time to collision TTC which is a time remaining prior to the collision of the own vehicle 10 with the forward obstacle $A_F$, based on the relative distance $D_A$, the relative speed $V_A$, and the relative acceleration $a_A$, of the own vehicle 10 and the forward obstacle $A_F$, and deceleration of the own vehicle 10 by the brake system 12.

The assist system of the present embodiment uses the time to collision TTC as an index indicative of a risk or possibility of collision of the own vehicle 10 with the forward obstacle $A_F$. Specifically, it is determined that there is a risk of collision of the own vehicle 10 with the forward obstacle $A_F$ when the time to collision TTC becomes smaller than a first set value $TTC_1$. In this instance, the alert device 16 is activated to call a driver's attention. Specifically, an indication "BRAKE!" is displayed, and a buzzer sounds. When the driver does not perform any braking operation in spite of the warning by the alert device 16 and the time to collision TTC becomes smaller than a second set value $TTC_2$ which is smaller than the first set value $TTC_1$, it is determined that the own vehicle 10 is in a situation in which the risk of collision with the forward obstacle $A_F$ is high, and the automatic braking control is executed.

In an instance where the driver starts the braking operation after the warning by the alert device 16 and before execution of the automatic braking control, braking assistance is executed. The braking assistance changes a braking-force generation state from a normal state in which the braking force is generated only by the fluid pressure generated by the brake actuator 22 without depending on the operation force applied to the brake operation member to a state in which the braking force is generated by both of the operation force applied to the brake operation member and the fluid pressure generated by the brake actuator 22.

When the conditions described above are satisfied and the own vehicle 10 is in the situation in which the risk of collision with the forward obstacle $A_F$ is high, the automatic braking control is executed. In the automatic braking control, the brake system 12 mounted on the own vehicle 10 automatically operates without depending on the driver's operation to brake the own vehicle 10, for the purpose of avoiding the collision with the obstacle present ahead of the own vehicle or reducing damage by the collision. Specifically, when the time to collision TTC becomes smaller than the second set value $TTC_2$, the DSS-ECU 40 transmits, to the brake system 12, a request to execute the automatic braking control, and the brake system 12 controls the brake actuator 22 to brake the own vehicle 10 in the shortest distance.

Before transmitting the request to execute the automatic braking control, the DSS-ECU 40 estimates a stop position at which the own vehicle 10 will stop when braked and a position at which the forward obstacle $A_F$ is located at the time when the own vehicle stops. It is determined, based on a relationship between those positions, whether the collision of the own vehicle 10 with the forward obstacle $A_F$ is unavoidable or not. In the assist system of the present embodiment, the avoidance control is executed in addition to the automatic braking control when it is determined that the collision is unavoidable only by execution of the automatic braking control.

(b) Avoidance Control

In the avoidance control, the electric power steering device 30 automatically operates so as to steer the wheels for enabling the own vehicle 10 to avoid the forward obstacle $A_F$ when it is determined that the collision is unavoidable only by execution of the automatic braking control. Specifically, the DSS-ECU 40 determines an avoidance route based on the parallax images of the stereo camera 42 obtained as described above. The avoidance route is basically determined by confirming routes for every steering amounts set within a range in which the own vehicle 10 is steerable and selecting the most appropriate one of the routes. In determination of the avoidance route, the stop position of the own vehicle 10 is estimated, and the avoidance route is determined in consideration of the stop position of the own vehicle 10.

When the forward obstacle $A_F$ is present in the driving lane of the own vehicle 10, the avoidance control executed in the present assist system enables the own vehicle 10 to avoid the forward obstacle $A_F$ within the driving lane, namely, without going out beyond the driving lane. Further, the avoidance control executed in the present assist system enables the own vehicle 10 to avoid the forward obstacle $A_F$ such that the own vehicle 10 travels toward one of opposite sides of the forward obstacle $A_F$ on which a distance between the forward obstacle $A_F$ and a corresponding one of the left and right boundaries $L_L$, $L_R$ is larger than the other of the opposite sides. That is, in the present assist system, when determining the avoidance route that enables the own vehicle 10 to avoid the forward obstacle $A_F$ present in the driving lane of the own vehicle 10, the avoidance route is searched for within the driving lane only on one of the right side and the left side of the own vehicle 10 (only on the left side in FIG. 3). Thus, the processing load of the DSS-ECU 40 is considerably reduced in the present assist system, as compared with an arrangement in which the avoidance route is searched for over the entirety of the steerable range.

In the present assist system, when there are found no routes for enabling the own vehicle 10 to avoid the forward obstacle $A_F$ within the driving lane, the avoidance control is not executed, and the damage by the collision with the forward obstacle $A_F$ is reduced only by the automatic braking control. Though there is a possibility that oncoming vehicles, parallel running vehicles, pedestrians, bicycles, and so on are present outside the driving lane, the own vehicle 10 is prevented from going out beyond the driving lane due to the avoidance control. It is thus possible to prevent an occurrence of a secondary accident in which the oncoming vehicles, the parallel running vehicles, the pedestrians, the bicycles, and so on get involved.

(c) Prohibition of Avoidance Control

Figure 3:
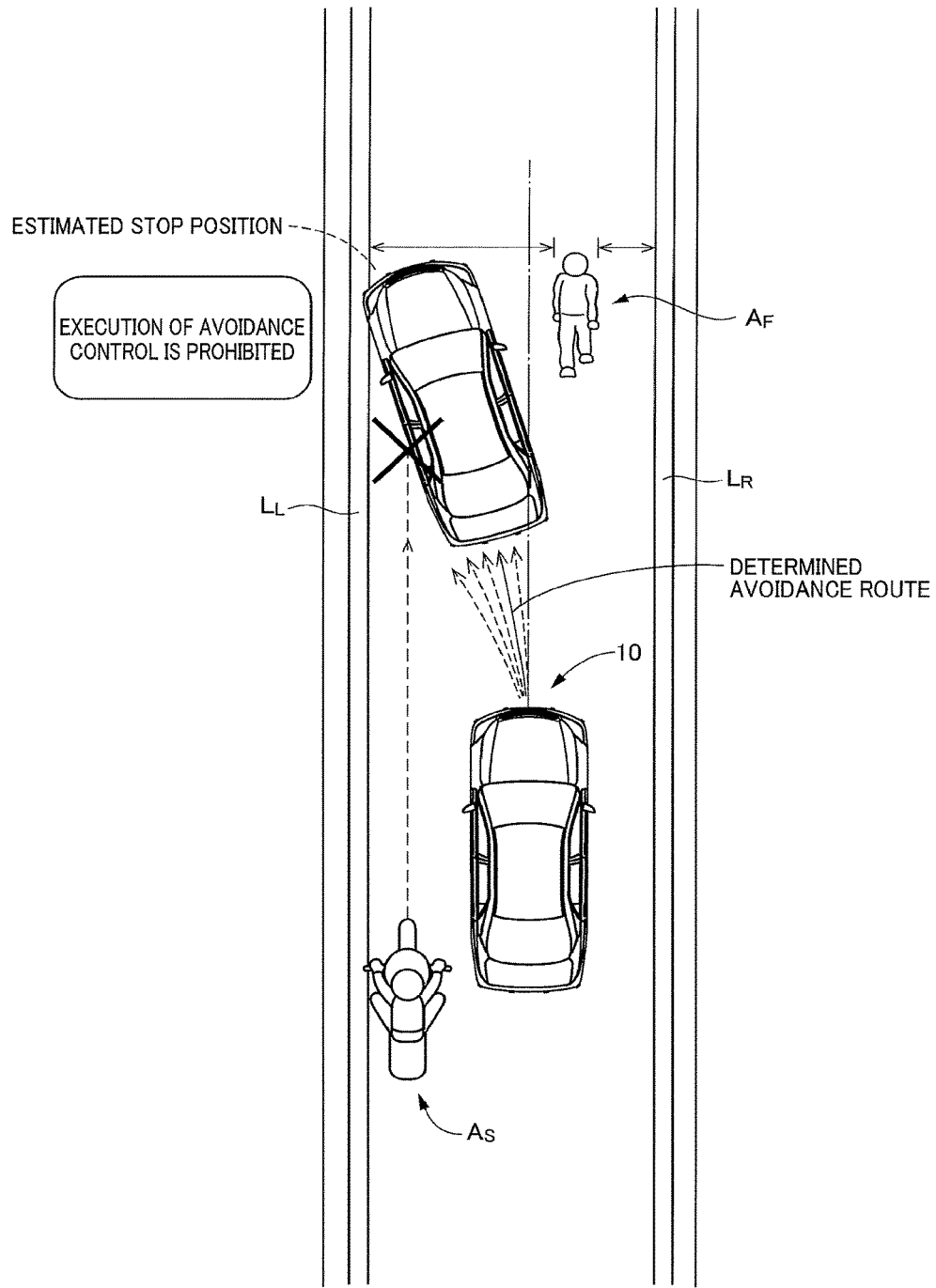
FIG. 3 is a plan view for explaining characteristics of the collision avoidance assist system, the view showing one example of a driving state of an own vehicle.

When there exists a lateral moving object As, such as a motorcycle or a bicycle, which is moving in the same driving lane in the same direction as the own vehicle 10, there is a risk that the own vehicle 10 will collide with the lateral moving object $A_S$ (e.g., a motorcycle running on the rear left side of the own vehicle 10 in FIG. 3) even if the own vehicle 10 avoids the forward obstacle $A_F$ by the avoidance control. In the present assist system, the lateral sides of the own vehicle 10 are constantly monitored by the four lateral millimeter wave radars 46, making it possible to avoid a collision between the own vehicle 10 and the lateral moving object $A_S$.

When the avoidance route is determined in the avoidance control, the DSS-ECU 40 obtains detection results of the front and rear lateral millimeter wave radars 46 provided on one of opposite lateral sides of the own vehicle 10 toward which the own vehicle 10 will travel to avoid the forward obstacle. The obtained detection results of the lateral millimeter wave radars 46 are overlaid on a planar two-dimensional map formed based on the detection results of the stereo camera 42 obtained during running of the own vehicle, and it is determined whether there exists, in the driving lane of the own vehicle 10, any lateral moving object $A_S$ that is moving in the same direction as the own vehicle 10. When the lateral moving object $A_S$ is detected, the DSS-ECU 40 estimates a movement course of the lateral moving object $A_S$ based on the detection results of the lateral millimeter wave radars 46. Based on the movement course and the avoidance route for avoiding the forward obstacle $A_F$, the DSS-ECU 40 determines whether there is a risk that the own vehicle 10 and the lateral moving object $A_S$ will collide with each other if the own vehicle 10 travels along the avoidance route. When there is a risk of collision between the own vehicle 10 and the lateral moving object $A_S$, the DSS-ECU 40 prohibits execution of the avoidance control and attempts to reduce damage by the collision with the forward obstacle $A_F$ only by the automatic braking control. Thus, the present assist system obviates a secondary accident in which the lateral moving object $A_S$ gets involved, as a result of execution of the avoidance control.

In the present assist system, when the forward obstacle $A_F$ is detected, the avoidance route for avoiding the forward obstacle $A_F$ is searched for irrespective of whether the avoidance control is to be executed or not. Consequently, when it is determined that the avoidance control should be executed and the avoidance route is determined by the DSS-ECU 40, the avoidance control can be immediately executed in the present assist system.

Control Programs

Figure 4:
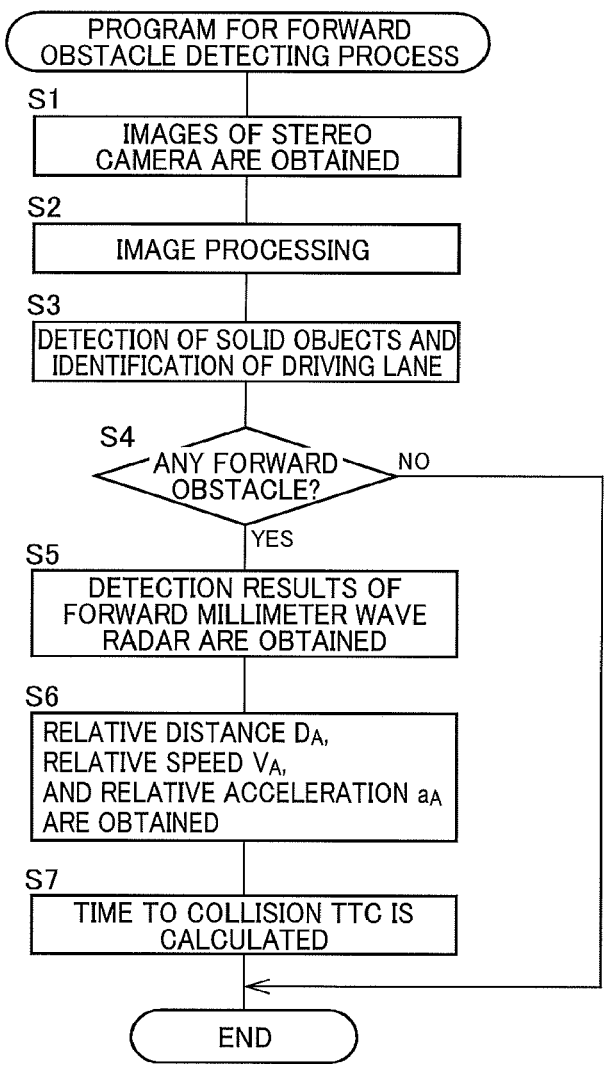
FIG. 4 is a flow chart showing a program for a forward obstacle detecting process executed by a controller of the collision avoidance assist system of FIG. 1.
Figure 5:
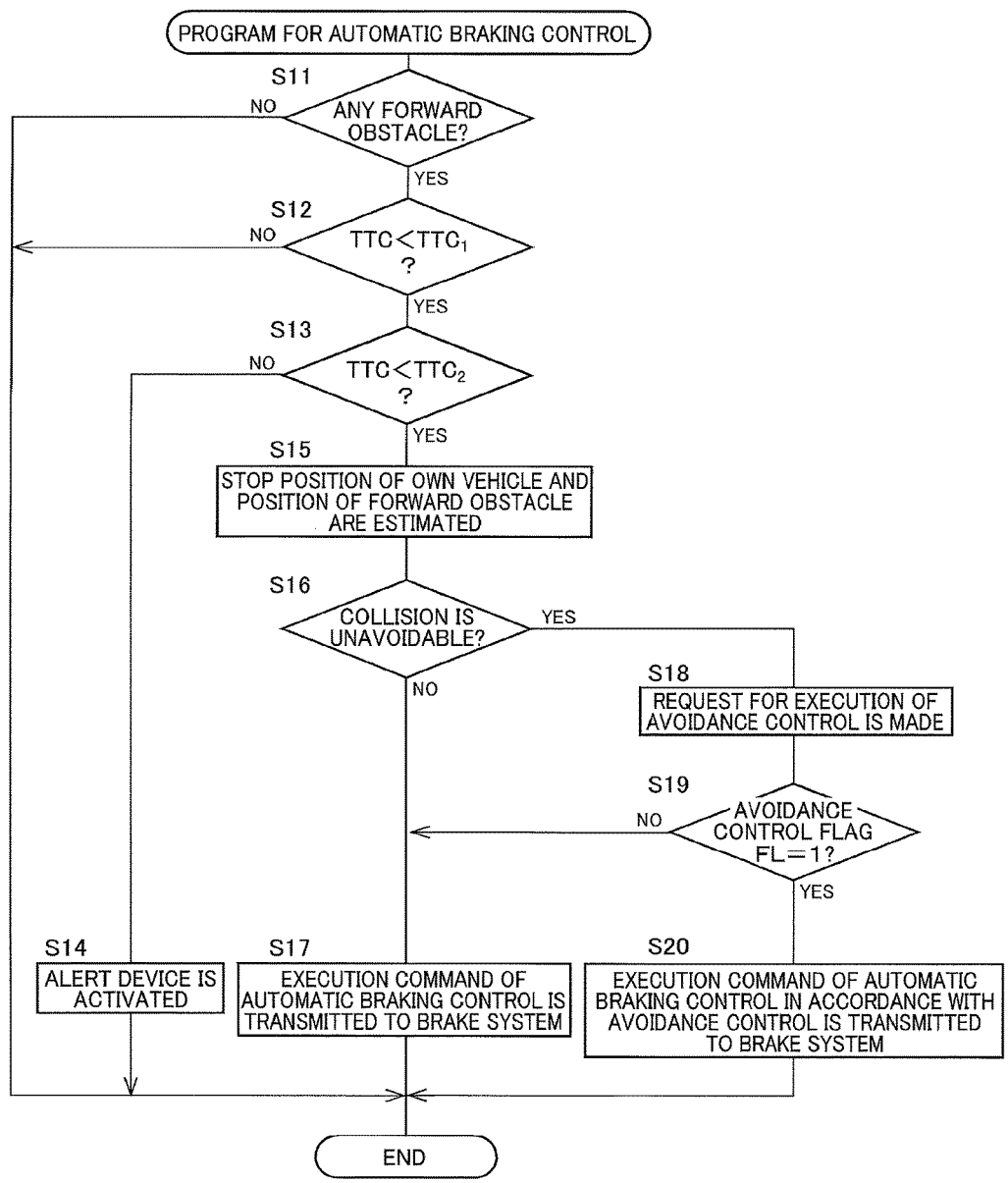
FIG. 5 is a flow chart showing a program for an automatic braking control executed by the controller of the collision avoidance assist system of FIG. 1.

The processes executed for assisting avoidance of the collision of the own vehicle 10 with the obstacle are executed such that the DSS-ECU 40 executes a program for a forward obstacle detecting process indicated by a flow chart of FIG. 4, a program for an automatic braking control indicated by a flow chart of FIG. 5, and a program for an avoidance control indicated by a flow chart of FIG. 6. These programs are repeatedly executed at a short time pitch from several to several tens of µsecs, for instance.

(a) Program for Forward Obstacle Detecting Process

In the program for the forward obstacle detecting process, images taken by the stereo camera 42 are obtained at Step 1 (hereinafter "Step" is abbreviated as "S"), and image processing is performed at S2 to form the parallax images and the planar two-dimensional map. At S3, solid objects or three-dimensional objects are detected based on the formed parallax images, and the boundaries of the driving lane are recognized so as to identify the driving lane.

It is subsequently determined at S4 whether there is a risk of collision of the own vehicle 10 with any of the detected solid objects, namely, whether any forward obstacle is present or not. When the forward obstacle is present, the detection results of the forward millimeter wave radar 44 are obtained at S5. At S6, the relative distance $D_A$ of the own vehicle 10 and the detected forward obstacle. $A_F$ is obtained based on the detection results of the stereo camera 42 and the detection results of the forward millimeter wave radar 44, and the relative speed $V_A$ and the relative acceleration $a_A$, of the own vehicle 10 and the forward obstacle $A_F$ are obtained based on the detection results of the forward millimeter wave radar 44. Subsequently, at S7, the time to collision TTC, which is a time remaining before the own vehicle 10 is expected to collide with the forward obstacle $A_F$, is calculated based on the relative distance $D_A$, the relative speed $V_A$, and the relative acceleration $a_A$. When no forward obstacle is present, S5-S7 are skipped. Thus, one execution of the program for the forward obstacle detecting process ends.

(b) Program for Automatic Braking Control

In the program for the automatic braking control indicated by the flow chart of FIG. 5, it is initially determined at S11 whether any forward obstacle is present. Only when the forward obstacle is present, S12 and subsequent steps are implemented. At S12 and S13, the value of the time to collision TTC is confirmed. When the time to collision TTC is larger than the first set value $TTC_1$, subsequent steps are skipped and no process is executed because enough time remains before the collision. When the time to collision TTC becomes smaller than the first set value $TTC_1$, the driver is notified of a danger of the collision, and the alert device 16 is activated to encourage the driver to operate the vehicle. When the time to collision TTC becomes smaller than the second set value $TTC_2$, the automatic braking control is executed according to the process of S15 and subsequent steps because the vehicle is in a situation in which the risk of collision with the forward obstacle is high.

Before the automatic braking control is started, there are estimated, at S15, the stop position of the own vehicle 10 at which the own vehicle 10 will stop when braked and the position at which the forward obstacle $A_F$ is located at the time when the own vehicle stops. It is subsequently determined at S16 whether the collision of the own vehicle 10 with the forward obstacle $A_F$ is unavoidable, based on the relationship between the estimated stop position of the own vehicle 10 and the estimated position of the forward obstacle $A_F$. When it is determined at S16 that the own vehicle 10 will not collide with the forward obstacle $A_F$, the control flow goes to S17 at which a command to execute the automatic braking control only by braking is transmitted to the brake system 12. On the other hand, when it is determined at S16 that the collision is unavoidable, a request to execute the avoidance control (according to the later explained program for the automatic control) is made at S18. Subsequently, at S19, a value of an avoidance control flag FL determined in the program for the avoidance control is confirmed. The avoidance control flag FL is set in the program for the avoidance control such that the flag value is 0 when the avoidance control is not executed and the flag value is 1 when the avoidance control is executed. When it is confirmed at S19 that the value of the avoidance control flag FL is 0, the control flow goes to S17 at which the command to execute the automatic braking control only by braking is transmitted to the brake system 12. On the other hand, when it is confirmed at S19 that the value of the avoidance control flag FL is 1, the control flow goes to S20 at which a command to execute the automatic braking control in accordance with the avoidance control is transmitted to the brake system 12. Thus, one execution of the program for the automatic braking control ends.

(c) Program for Avoidance Control

In the program for the avoidance control indicated by the flow chart of FIG. 6, it is initially determined at S21 whether any forward obstacle is present. S22 and subsequent steps are implemented only when the forward obstacle is present. At S22, the avoidance route for avoiding the forward obstacle $A_F$ is searched for in the driving lane of the own vehicle 10 in consideration of the position of the forward obstacle $A_F$ with respect to the boundaries $L_L$, $L_R$. It is subsequently determined at S23 whether any avoidance route is found. When it is determined at S23 that no avoidance routes are found, the avoidance control cannot be executed. In this case, the value of the avoidance control flag FL is set to 0 at S24, and one execution of the program for the avoidance control ends.

When the avoidance route is found, the detection results of the two, i.e., the front and rear, lateral millimeter wave radars 46 on one of the right side and the left side toward which the own vehicle 10 will travel to avoid the forward obstacle are obtained at S25. It is subsequently determined at S26 whether any object is detected within the driving lane of the own vehicle 10 by the lateral millimeter wave radars 46. When no objects are detected by the lateral millimeter wave radars 46 or when the detected object is present outside the driving lane, the avoidance control is executable and the value of the avoidance control flag FL is set to 1 at S30. Thus, one execution of the program for the avoidance control ends.

When it is determined at S26 that the object is detected within the driving lane of the own vehicle 10 by the lateral millimeter wave radars 46, the control flow goes to S27 to determine whether the object is moving in the same direction as the own vehicle 10. When an affirmative decision is made at S27, it is determined that a lateral moving object $A_S$ is present and a movement course of the lateral moving object $A_S$ is estimated at S28. When a negative decision is made at S27, S28 is skipped. Subsequently, at S29, it is determined whether the own vehicle 10 will collide with the object detected by the lateral millimeter wave radars 46 if the own vehicle travels along the avoidance route. When the object present in the driving lane of the own vehicle 10 is the lateral moving object $A_S$, it is determined whether the own vehicle 10 will collide with the lateral moving object $A_S$ if the own vehicle 10 travels along the avoidance route, based on the avoidance route for avoiding the forward obstacle $A_F$ determined at S22 and the movement course and the moving speed of the lateral moving object $A_S$.

When it is determined at S29 that there is no risk of collision of the own vehicle 10 with the object present on its lateral side, the avoidance control is executable and the value of the avoidance control flag FL is set to 1 at S30. On the other hand, when it is determined at S29 that there is a risk of collision of the own vehicle 10 with the object present on its lateral side, the value of the avoidance control flag FL is set to 0 at S24. After S30 at which the value of the avoidance control flag FL is set to 1, it is determined at S31 whether the request to execute the avoidance control has been made in the program for the automatic braking control. When the request has been made, the control flow goes to S32 at which a command to permit the own vehicle 10 to travel along the determined avoidance route is transmitted to the steering system 14. Thus, one execution of the program for the avoidance control ends.

Functional Configuration of Collision Avoidance Assist System

The DSS-ECU 40 as a controller for executing the control described above includes functional portions to execute the processes explained above. As shown in FIG. 1, the DSS-ECU 40 includes: a forward obstacle detecting portion 100 configured to detect the forward obstacle based on the detection results of the stereo camera 42; a driving lane identifying portion 102 configured to identify the driving lane of the own vehicle 10 based on the detection results of the stereo camera 42; a collision judging portion 104 configured to judge the risk of collision of the own vehicle 10 with the forward obstacle detected by the forward obstacle detecting portion 100; a notification process executing portion 106 configured to activate the alert device 16 when there is a risk that the own vehicle 10 will collide with the forward obstacle; an automatic braking control executing portion 108 configured to execute the automatic braking control when the risk of collision of the own vehicle 10 with the forward obstacle is high; and an avoidance control executing portion 110 configured to execute the avoidance control when the risk of collision of the own vehicle 10 with the forward obstacle is still high even after the automatic braking control has been executed.

In the DSS-ECU 40 as the controller in the present collision avoidance assist system, the forward obstacle detecting portion 100 and the driving lane identifying portion 102 are constituted so as to include a portion that executes S1-S3 of the program for the forward obstacle detecting process. In the present collision avoidance assist system, the stereo camera 42 and the forward obstacle detecting portion 100 constitute a forward obstacle detecting device. The collision judging portion 104 is constituted so as to include a portion that executes S5-S7 of the program for the forward obstacle detecting process and a portion that executes S11-S16 of the program for the automatic braking control. The notification process executing portion 106 is constituted so as to include a portion that executes S14 of the program for the automatic braking control.

The automatic braking control executing portion 108 is constituted so as to include a portion that executes S17 and S20 of the program for the automatic braking control. The avoidance control executing portion 110 is constituted so as to include a portion that executes S22 and S32 of the program for the avoidance control. The portion that executes S22 of the program for the avoidance control functions as an avoidance route determining portion 112, and the avoidance control executing portion 110 includes the avoidance route determining portion 112.

The DSS-ECU 40 further includes: a lateral moving object detecting portion 120 (that partially constitutes a lateral object detecting device) configured to detect the lateral moving object that is moving on the lateral side of the own vehicle 10 in the same direction as the own vehicle 10, based on the detection results of the lateral millimeter wave radars 46; and an avoidance control prohibiting portion 122 configured to determine whether there is a risk of collision with the lateral moving object and to prohibit execution of the avoidance control when there is the risk of collision with the lateral moving object. The lateral moving object detecting portion 120 is constituted so as to include a portion that executes S25-27 of the program for the avoidance control, and the avoidance control prohibiting portion 122 is constituted so as to include a portion that executes S28-30 of the program for the avoidance control.

What is claimed is:

1. A vehicle collision avoidance assist system for assisting avoidance of a collision between an own vehicle on which the system is installed and an obstacle, the system comprising:
 a forward obstacle detecting device configured to detect, as a forward obstacle, one of objects present ahead of the own vehicle that will hinder the own vehicle from travelling forward;
 a lateral object detecting device configured to detect an object present on a lateral side of the own vehicle; and
 a controller configured to
  calculate a time to collision of the own vehicle with the forward obstacle detected by the forward obstacle detecting device, the forward obstacle being present in a driving lane of the own vehicle,
  execute an automatic braking control in which a brake apparatus installed on the own vehicle automatically operates to brake the own vehicle when the calculated time to collision is less than a first predetermined value,
  estimate a stop position of the own vehicle and estimating a position of the forward obstacle when the own vehicle has stopped,
  determine whether a collision of the own vehicle with the forward obstacle is unavoidable based on the estimated stop position of the own vehicle and the estimated position of the forward obstacle when the own vehicle has stopped,
  request to execute an avoidance control, in which a steering apparatus installed on the own vehicle automatically operates to enable the own vehicle to avoid the forward obstacle, when a collision of the own vehicle with the forward obstacle is determined to be unavoidable,
  determine an avoidance route for the own vehicle to avoid the forward obstacle,
  estimate a movement course of a lateral moving object when the lateral object detecting device detects the lateral moving object that is moving within the driving lane of the own vehicle on a lateral side of the own vehicle and travelling in a same direction as the own vehicle is travelling,
  determine whether the own vehicle will collide with the lateral moving object if the own vehicle travels along the avoidance route based on the determined avoidance route and the estimated movement course of the lateral moving object,
  allow execution of the avoidance control in which the steering apparatus enables the own vehicle to travel along the avoidance route when it is determined that the own vehicle will not collide with the lateral moving object, and
  prohibit execution of the avoidance control when it is determined that the own vehicle will collide with the lateral moving object.

2. The vehicle collision avoidance assist system according to claim 1, further comprising a driving lane identifying device configured to identify the driving lane by recognizing a right boundary and a left boundary of the driving lane,
 wherein the controller is configured to execute the avoidance control to enable the own vehicle to avoid the forward obstacle such that the own vehicle travels toward one of opposite sides of the forward obstacle on which a distance between the forward obstacle and a corresponding one of the right boundary and the left boundary of the driving lane is larger than the other of the opposite sides when the forward obstacle detecting device detects the forward obstacle in the driving lane.

3. The vehicle collision avoidance assist system according to claim 1, further comprising an alert device configured to issue an alert to a driver of the own vehicle when the calculated time to collision is greater than the first predetermined value and less than a second predetermined value, the second predetermined value being greater than the first predetermined value,
 wherein the controller is configured to execute the automatic braking control when the driver performs no operation after the issuance of the alert and the calculated time to collision is less than the first predetermined value.

4. The vehicle collision avoidance assist system according to claim 1, wherein the lateral object detecting device includes a lateral millimeter wave radar.

5. The vehicle collision avoidance assist system according to claim 1, further comprising a stereo camera disposed on a front middle of a body of the own vehicle and including a pair of cameras arranged in a right-left direction of the own vehicle,
 wherein the controller is configured to determine the avoidance route for the own vehicle to avoid the forward obstacle based on parallax images of the stereo camera.

\* \* \* \* \*